(12) United States Patent
Skinner et al.

(10) Patent No.: US 11,578,825 B2
(45) Date of Patent: Feb. 14, 2023

(54) PIPE JOINT SEAL FOR POLYMER PIPING

(71) Applicant: Press-Seal Corporation, Fort Wayne, IN (US)

(72) Inventors: Peter J. Skinner, Columbia City, IN (US); Jimmy D. Gamble, Kendallville, IN (US); Jacob L. B. Morris, Huntington, IN (US)

(73) Assignee: Press-Seal Corporation, Fort Wayne, IN (US)

( * ) Notice: Subject to any disclaimer, the term of this patent is extended or adjusted under 35 U.S.C. 154(b) by 237 days.

(21) Appl. No.: 16/854,238

(22) Filed: Apr. 21, 2020

(65) Prior Publication Data

US 2020/0347966 A1     Nov. 5, 2020

Related U.S. Application Data

(60) Provisional application No. 62/842,045, filed on May 2, 2019.

(51) Int. Cl.
*F16L 17/025*     (2006.01)
*F16L 21/035*     (2006.01)

(52) U.S. Cl.
CPC .......... *F16L 17/025* (2013.01); *F16L 21/035* (2013.01)

(58) Field of Classification Search
CPC ......... F16L 21/02; F16L 21/025; F16L 21/03; F16L 21/035; F16L 17/025
See application file for complete search history.

(56) References Cited

U.S. PATENT DOCUMENTS

| 1,888,539 | A | | 11/1932 | Otterson | |
|---|---|---|---|---|---|
| 2,935,349 | A | * | 5/1960 | Burch | F16L 17/025 285/295.2 |
| 4,120,521 | A | | 10/1978 | Gunnar | |
| 4,299,412 | A | | 11/1981 | Parmann | |
| 4,602,792 | A | | 7/1986 | Andrick | |
| 4,602,793 | A | * | 7/1986 | Andrick | F16L 17/025 285/379 |
| 4,693,483 | A | | 9/1987 | Valls | |

(Continued)

FOREIGN PATENT DOCUMENTS

| DE | 26 54 059 | 1/1978 |
|---|---|---|
| EP | 0 713 992 | 5/1996 |

(Continued)

*Primary Examiner* — Gilbert Y Lee
(74) *Attorney, Agent, or Firm* — Faegre Drinker Biddle & Reath LLP

(57) ABSTRACT

A seal assembly is configured for use at PVCO pipe junctions. The seal assembly includes a main seal body made of a monolithic resilient material, such as rubber, and a stiffener. The seal has a stiffener pocket sized and configured to accept the stiffener, such that the stiffener can be assembled to the seal body by hand. This assembly can then be installed into the bell end of a first PVCO pipe, and a spigot end of a second PVCO pipe may then be inserted into the bell end and engaged with a main sealing lobe of the seal assembly. The seal assembly is configured to reliably withstand the insertion process, without damage or degradation to the sealing structures. Once installed, the seal assembly provides a robust fluid-tight seal along all potential leak paths between the seal assembly and the first and second pipes.

21 Claims, 9 Drawing Sheets

(56) References Cited

U.S. PATENT DOCUMENTS

| | | | |
|---|---|---|---|
| 6,113,159 A * | 9/2000 | Corbett, Jr. | F16L 21/03 |
| | | | 285/345 |
| 6,299,176 B1 | 10/2001 | Guzowski et al. | |
| 7,140,618 B2 | 11/2006 | Valls, Jr. | |
| 7,252,293 B2 | 8/2007 | Happel | |
| 8,544,851 B2 | 10/2013 | Holmes, IV et al. | |
| 8,870,188 B2 | 10/2014 | Holmes, IV et al. | |
| 9,085,101 B2 * | 7/2015 | Guzowski | F16L 21/03 |
| 9,121,532 B2 | 9/2015 | Holmes, IV et al. | |
| 9,194,519 B2 | 11/2015 | Holmes, IV et al. | |
| 9,951,869 B2 | 4/2018 | Lopez-Chaves et al. | |
| 2012/0175848 A1 | 7/2012 | Leonard et al. | |
| 2017/0198847 A1 | 7/2017 | Clapper et al. | |
| 2018/0017194 A1 | 1/2018 | Grouillet et al. | |
| 2018/0094754 A1 | 4/2018 | Quesada | |
| 2018/0245727 A1 | 8/2018 | Quesada | |

FOREIGN PATENT DOCUMENTS

| | | |
|---|---|---|
| WO | WO 99/66248 | 12/1999 |
| WO | WO00/11378 | 3/2000 |

* cited by examiner

PIPE JOINT SEAL FOR POLYMER PIPING

CROSS-REFERENCE TO RELATED APPLICATIONS

This application claims priority under 35 U.S.C. § 119(e) to U.S. Provisional Patent Application Ser. No. 62/842,045, filed on May 2, 2019, the entire disclosure of which is expressly incorporated by reference herein.

BACKGROUND

1. Technical Field

The present disclosure relates to seals used at pipe joints and, in particular, to seals used in connection with Molecularly Oriented Polyvinyl Chloride (PVCO) pipes.

2. Description of the Related Art

PVCO piping, which is made from molecularly oriented polyvinyl chloride, can be used for conveyance of liquids or other flowable material. In particular, PVCO piping is gaining increased acceptance for use in municipal underground systems, such as sewage and wastewater and potable water conveyance.

PVCO pipes are made by "stretching" warm PVC to increase the inner diameter thereof. This "stretching" is accomplished by passing a PVC pipe over a set of progressively larger mandrels. This sets the molecules in a strong orientation to create PVCO piping, which is suitable for use in high-strength applications such as underground sewage, water and other conveyance systems.

Existing flexible seals or gaskets for sealing PVCO pipes are known. At a connection between the bell end of a first pipe and the spigot end of a second pipe, the spigot end is inserted into the bell end. The bell end includes a flexible seal which is deformed or deflected by the spigot end in an attempt to form a fluid-tight seal. This flexible seal is typically installed into a groove formed in the sidewall of the pipe, and includes a seal lobe which, when undeformed, occupies part of the cross-sectional area normally occupied by the spigot end. When the spigot end is inserted into the bell end, this seal lobe deformed or deflected to create the seal. However, known seal designs may be prone to "rolling out" of the groove when engaged by the spigot end, which represents a complete failure of the seal.

What is needed is an improvement over the foregoing.

SUMMARY

The present disclosure provides a seal assembly configured for use at PVCO pipe junctions. The seal assembly includes a main seal body made of a monolithic resilient material, such as rubber, and a stiffener. The seal has a stiffener pocket sized and configured to accept the stiffener, such that the stiffener can be assembled to the seal body by hand. This assembly can then be installed into the bell end of a first PVCO pipe, and a spigot end of a second PVCO pipe may then be inserted into the bell end and engaged with a main sealing lobe of the seal assembly. The seal assembly is configured to reliably withstand the insertion process, without damage or degradation to the sealing structures. Once installed, the seal assembly provides a robust fluid-tight seal along all potential leak paths between the seal assembly and the first and second pipes.

In one form thereof, the present disclosure provides a seal assembly for a polymer pipe joint, the seal assembly including an annular flexible seal body configured to be installed about the inner periphery of the polymer pipe joint, such that the seal body defines a flow path therethrough with a flow axis, and an annular stiffener. The seal body includes a spigot-side sealing surface; a bell-side sealing surface angled with respect to the spigot-side sealing surface, both the spigot-side sealing surface and the bell-side sealing surface facing radially outwardly from the flow axis; a main sealing lobe extending radially inwardly from the seal body; and a stiffener pocket extending into the seal body from the bell-side sealing surface. The annular stiffener is sized to be received within and occupy the stiffener pocket.

In another form thereof, the present disclosure provides a polymer pipe joint including a seal assembly including an annular flexible seal body configured to be installed about an inner periphery of the polymer pipe joint, such that the seal body defines a flow path therethrough with a flow axis, the seal body including a spigot-side sealing surface; a bell-side sealing surface angled with respect to the spigot-side sealing surface, both the spigot-side sealing surface and the bell-side sealing surface facing radially outwardly from the flow axis; and a main sealing lobe extending radially inwardly from the seal body; and a nose at a spigot-side terminus of the seal body; and a first polymer pipe having a bell end including a groove having the seal assembly received therein, the bell end having a first radial extent upstream and downstream of the groove, and the groove have a second radial extent larger than the first radial extent, the seal body received within the groove and the main sealing lobe extending radially inward of the first radial extent, wherein the nose of the seal body is radially outside of the first radial extent.

In a further form thereof, the present disclosure provides a method of configuring a seal assembly for use in sealing a bell of a first pipe and a spigot end of a second pipe comprising: providing a sealing body assembly including a spigot-side sealing surface, a bell-side sealing surface, a main sealing lobe, and a stiffener pocket; providing two or more annular stiffeners wherein each stiffener has a different size of an annular diameter; selecting one of the one or more annular stiffeners based on an annular diameter of the bell and an annular diameter of the spigot; inserting the selected annular stiffener into the stiffener pocket of the sealing body; and determining if a seal between the bell-side sealing surface, the spigot-side sealing surface, and the lobe is water tight after inserting the selected annular stiffener into the stiffening pocket.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
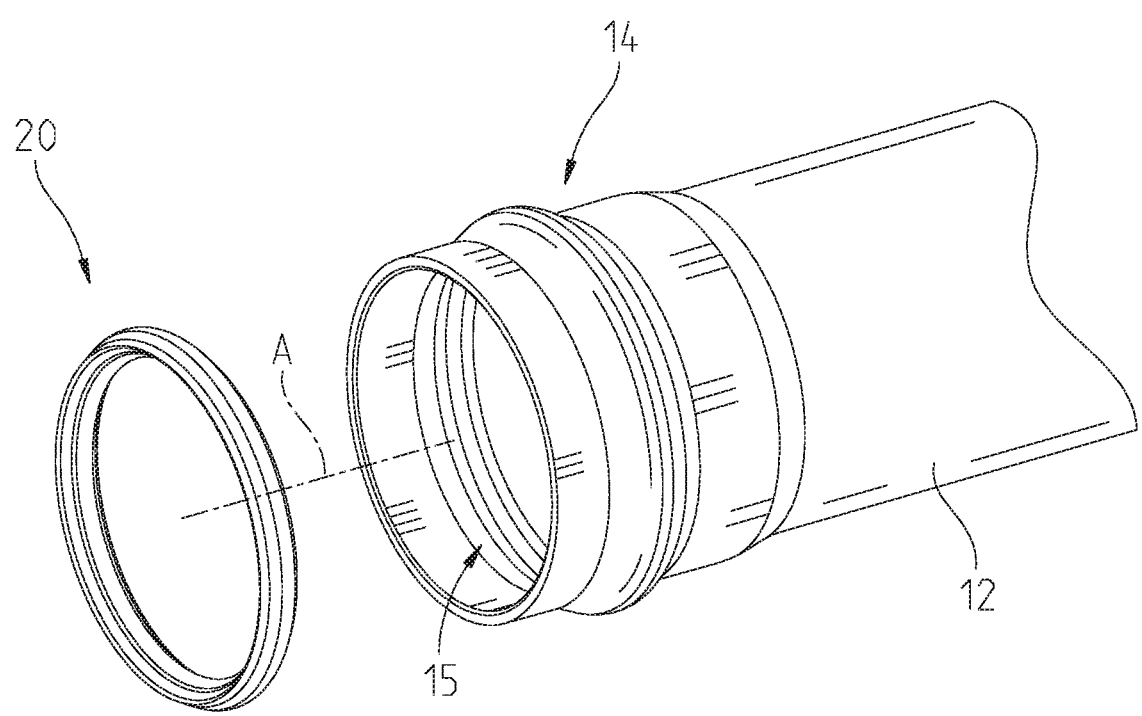
FIG. 1 is a perspective view of a seal assembly made in accordance with the present disclosure, shown along an installation path into a bell end of a pipe.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

The present disclosure is directed to a seal assembly 20, shown in FIGS. 1-10, which is designed to be user-installed into a groove 15 formed in a bell end 14 of a first pipe 12 (FIG. 1). As described in detail below, the seal assembly 20 provides an effective, reliable and durable fluid-tight seal between pipes 12 and 16, in part by including features which withstand the forces exerted on seal assembly 20 during coupling of bell end 14 to a spigot end 18 of a second PVCO pipe 16 (FIGS. 2 and 6-8).

Figure 2:
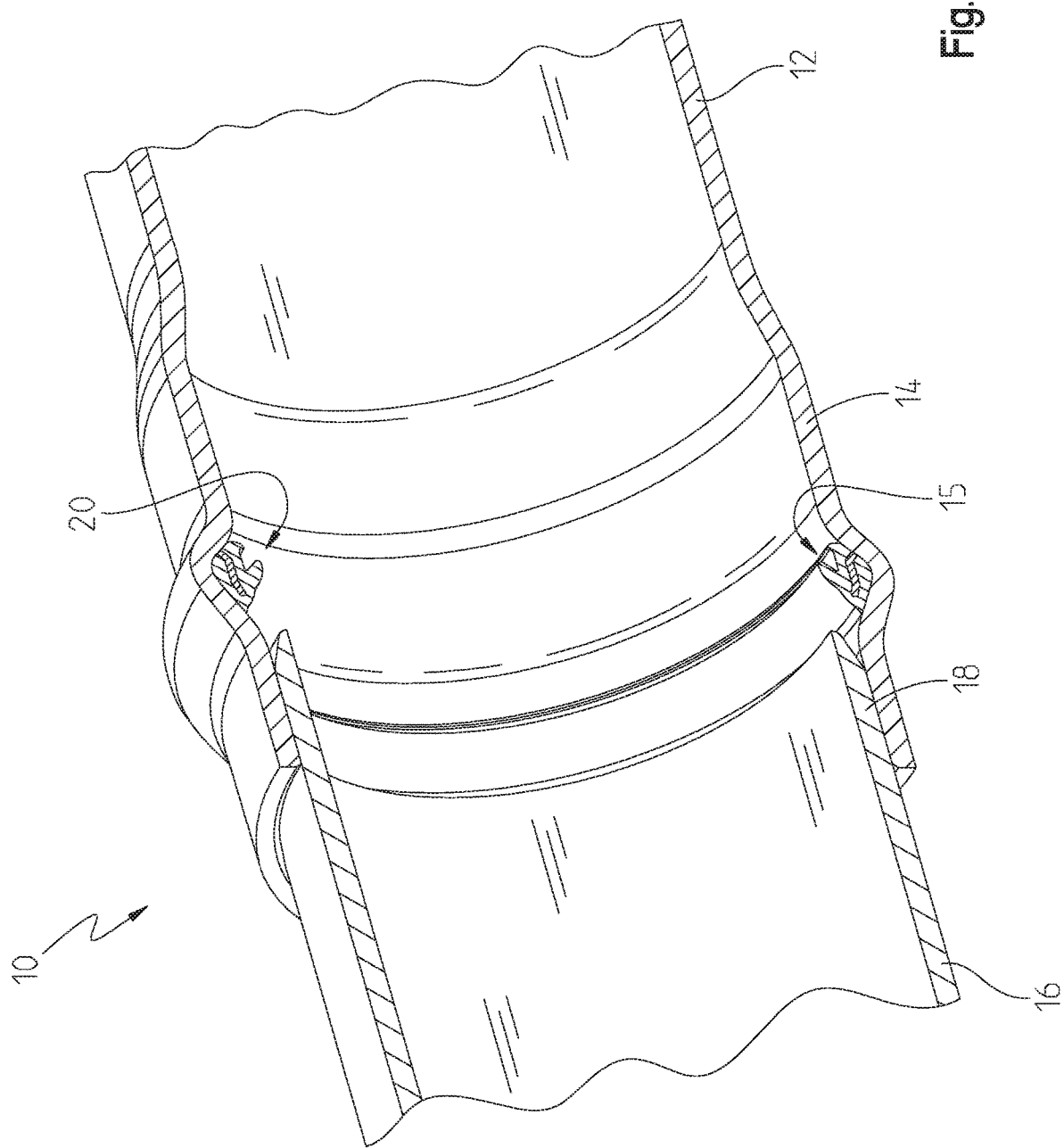
FIG. 2 is a perspective, cross-section view of the seal assembly shown in FIG. 1, after installation into the bell end of the first pipe, and showing a second pipe in the beginning stages of assembly to the first pipe.

As best seen in FIG. 2, bell end 14 has an expanded diameter compared to the main body of pipe 12, such that bell end 14 can accept the spigot end 18 of a second pipe 16. In a typical installation, pipes 12, 16 are identical, such that each pipe includes a bell end and a spigot end. Within bell end 14, the expanded portion includes a first radial extent upstream and downstream of groove 15, and groove 15 has a second radial extent larger than the first radial extent, thereby providing a space sized to receive seal assembly 20. The radial extent of the rest of pipe 12 is the flow path along a longitudinal flow axis A (FIG. 1), and the diameter of this flow path establishes the nominal diameter of pipe assembly 10. For purposes of the present disclosure, an "axial" direction is a direction along or parallel to axis A, while a "radial" direction is perpendicular to axis A. An "inner" or "radially inward" feature is one relatively closer to or facing toward axis A, while an "outer" or "radially outward" feature is relatively further from or facing away from axis A.

Figure 4:
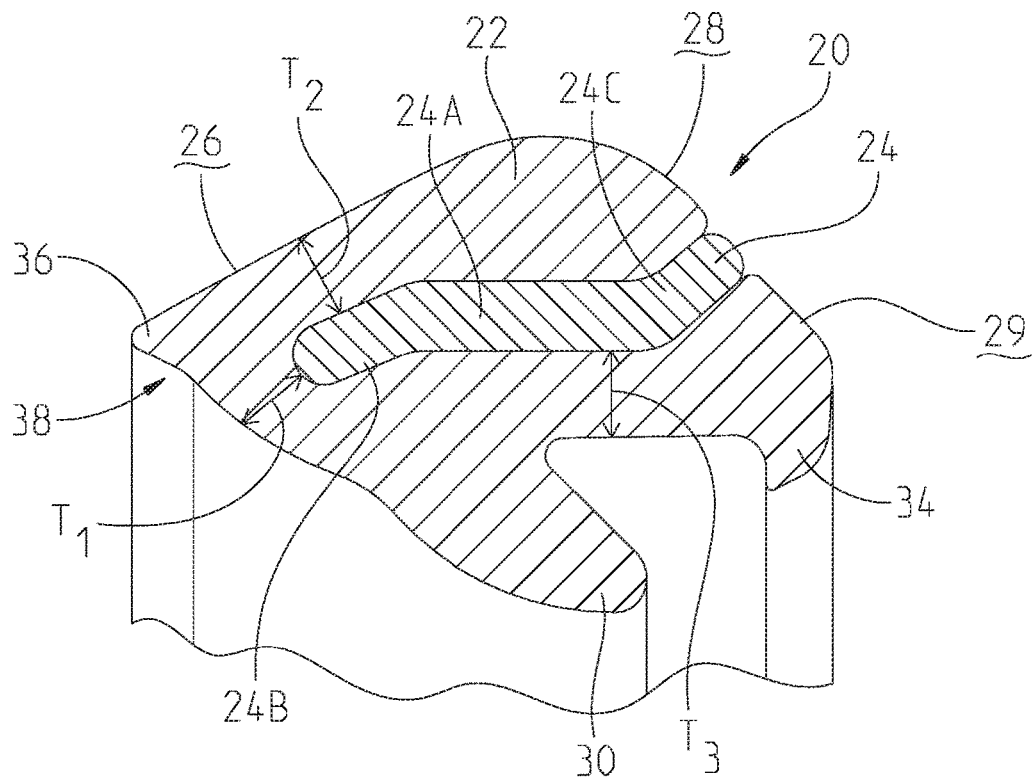
FIG. 4 is an elevation, cross-section view of the seal assembly shown in FIGS. 1 and 2.
Figure 5:
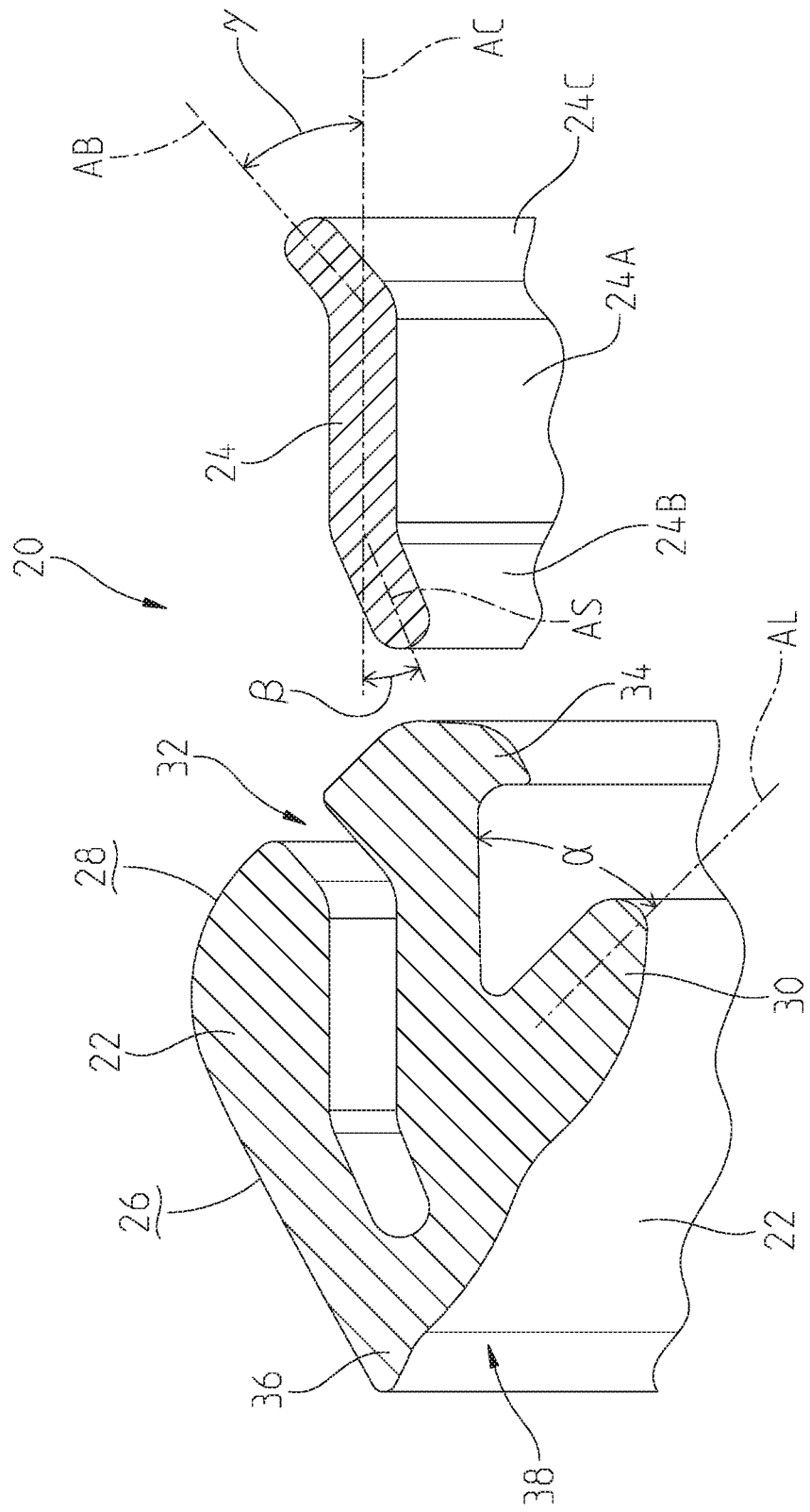
FIG. 5 is an elevation, exploded, cross-section view of the seal assembly of FIG. 4.

As best seen in FIGS. 4 and 5, seal assembly 20 is a two piece, interlocking design including a seal body 22 and stiffener 24. Seal body 22 and stiffener 24 are annular structures, as shown in FIG. 1. Seal body 22 is made of a flexible material such as rubber and has a constant density and durometer throughout the cross-sectional area of seal body 22. Stiffener 24 is sized and configured to be received within stiffener pocket 32 of seal body 22, as shown in FIG. 5 and further described below, and is made from a material more rigid than seal body 22 to provide mechanical support and distribution of forces throughout the seal body 22 in use. Stiffener 24 and seal body 22 are designed to be flexible enough stiffener 24 to be installed by hand into pocket 32 of seal body 22, and for the assembly 20 to then be installed by hand into groove 15 of bell end 14 of a pipe 12 (FIG. 1).

In an exemplary embodiment, seal body 22 may be made from SBR, EPDM, TPE or any other suitable resilient material, and has a shore A durometer between 50 and 65. Stiffener 24 may be made from any of various different grades of engineered thermoplastic resins such PP, HDPE, or PE, and may include various types of different fillers or additives as needed to achieve desired performance characteristics. Stiffener 24 may have a shore D durometer of between 65 and 90. These materials and material properties allow the shape and configuration of pocket 32 of main seal body 22 to resiliently deform to accept the insertion of stiffener 24, and the resulting seal assembly 20 remains flexible enough to be resiliently deformed as is worked into place within groove 15 of bell end 14 of pipe 12 (FIG. 2).

Figure 3:
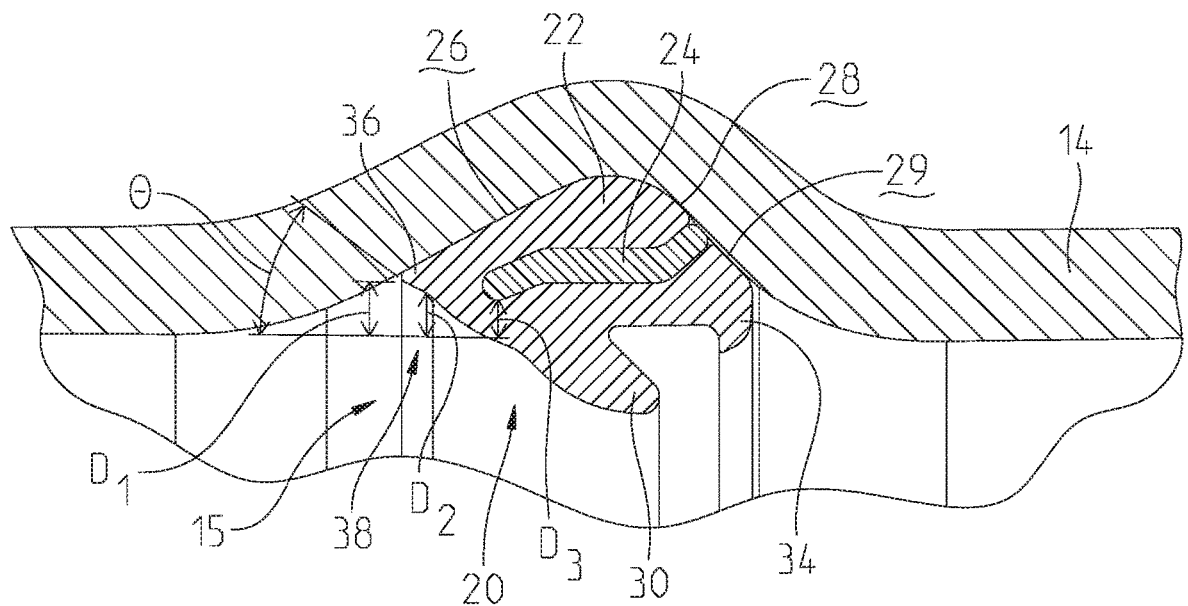
FIG. 3 is an elevation, cross-section view of the seal assembly installed in the bell end of a pipe, as shown in FIG. 2.

Turning to FIG. 3, seal assembly 20 is shown installed within groove 15, which includes inwardly-facing sloped surfaces which are approximately perpendicular to one another, and with a rounded transition between these surfaces. As illustrated, a spigot-side groove sealing surface 26 engages one of these sloped surfaces within groove 15, while a pair of bell-side groove sealing surfaces 28, 29 engage the opposing sloped surface of groove 15. Spigot-side surface 26 and bell-side surfaces 28, 29 are angled with respect to one another and have a rounded transition corresponding to the geometry of the inner surfaces of groove 15, such that the radially outwardly-facing sealing surfaces 26, 28 and 29 collectively conform to groove 15 as shown. This conformity, in conjunction with the action of stiffener 24 and the other features of sealing body 20 described in detail below, ensures a fluid-tight fit between the radially outwardly-facing surfaces 26, 28 and 29 of seal body 22 and the abutting radially inwardly facing surfaces of groove 15.

As best seen in FIG. 5, stiffener pocket 32 interrupts the bell-side sealing surface of seal body 22, such that the first and second sealing surfaces 28, 29 are on opposite sides of stiffener pocket 32 and, therefore, on opposite sides of stiffener 24 after installation (FIG. 4). This arrangement provides a fluid-tight seal for stiffener pocket 32 from both the spigot-side and the bell-end side, as best shown in FIG. 3, while also permitting stiffener 24 to come in direct contact with the inwardly facing surface of groove 15 to provide robust mechanical support to seal body 22 as further described below. Moreover, this mechanical support cooperates with the conformity of sealing surfaces 26, 28 and 29 to the surface of groove 15 to ensure that both fluid egress from the flow path defined by pipe assembly 10 (FIG. 2), as well as fluid ingress into this flow path, are both protected against by seal assembly 20.

Stiffener pocket 32 has a shape and size commensurate with the shape and size of the stiffener 24, such that stiffener 24 occupies the entire volume of stiffener pocket 32 when installed to seal body 22 (FIG. 4). In particular and referring to FIG. 5, stiffener 24 has a three-part profile including a central portion 24A, spigot end portion 24B and bell-end portion 24C. Central portion 24A defines axis AC extending along a generally axial direction (i.e., parallel to axis A), while spigot end portion 24B extends radially inwardly from central portion 24A along axis AS to form angle β of between 20 and 30 degrees, such as about 25 degrees or, in the illustrated embodiment, 24 degrees. The opposing bell-end portion 24C extends radially outwardly from central portion 24A along axis AB, forming angle γ which is larger than angle β, and equal to between 30 and 50 degrees, such as about 40 degrees or, in the illustrated embodiment, 42 degrees. As noted above, stiffener pocket 32 is formed to have the same size and shape as stiffener 24 in cross-section, such that stiffener pocket 32 also defines axes AC, AS and AB and angles β and γ.

As best seen in FIG. 4, this spatial arrangement for stiffener 24 and stiffener pocket 32 establishes a relatively constant material thickness for seal body 22, such that a minimum nominal thickness of seal body 22 is maintained throughout its cross-sectional extent. In particular, referring to FIG. 4, seal body 22 includes three minimum thicknesses T1, T2 and T3 which are all approximately equal to one another. Thickness T1 is formed between the axial end of spigot-side portion 24B of stiffener 24 and the nearest exterior surface of seal body 22 near nose 36. Thickness T2 is formed between the radially outward surface of spigot-side portion 24B of stiffener 24 and spigot-side sealing surface 26. Thickness T3 is between the radially inward surface of central portion 24A of stiffener 24 and the nearest exterior surface of seal body 22, adjacent main sealing lobe 30. In the illustrated embodiment, thicknesses T1, T2 and T3 are all within 15-20% of one another, which promotes even distribution of forces experienced by seal body 22 during use, including external forces arising from seal deformation and deflection, as well as internal forces exerted by stiffener 24 on seal body 22. For example, in the illustrated embodiment (which is shown to scale as noted herein), thickness T1 is about 0.1251 inches, thickness T2 is about 0.1493 inches, and thickness T3 is about 0.1468 inches for a maximum variation of about 16%.

As noted above, seal body 22 and stiffener 24 are configured to be assembled to one another by hand. The relatively low angle β formed between spigot end portion 24B and central portion 24A of stiffener 24, and the commensurately shaped portions of stiffener pocket 32, facilitate this insertion. However, angle β is also large enough to inhibit removal or relative movement of stiffener 24 from seal body 22 after installation, thereby contributing to a "mechanical bond" between the two components that arises from the relative geometry therebetween. In addition, the relatively larger angle γ between bell-end portion 24C and central portion 24A also enhances this mechanical bond, while still allowing manual assembly of stiffener 24 into stiffener pocket 32.

This two-piece, interlocking design of seal assembly 20 provides consistent and positive positioning of stiffener 24 within seal body 22, while also facilitating the complete and accurate seating of stiffener 24 within stiffener pocket 32 such that stiffener 24 completely occupies pocket 32. Moreover, stiffener 24 may be retained within seal body 22 during installation, and during service of seal assembly 20, without the use of adhesives or other chemical bonding. By contrast, predicate seal designs used for PVCO piping typically use adhesive, chemical bonding or overmolded designs, which are more expensive and complicated.

In addition, the two-piece design of seal assembly 20 facilities efficient manufacture with minimal waste, by allowing seal body 22 and stiffener to be produced separately and in large quantities and shipped to a customer or job site as separate components. To the extent that a manufacturing defect may be found either component, only that component needs to be replaced in order to successfully assemble seal assembly 20. Separate manufacture of seal body 22 as a monolithic and constant-density structure, as noted above, also allows for high tolerance manufacturing at a relatively low cost. Similarly, stiffener 24 may also be a monolithic and constant-density structure which is also efficiently produces to high tolerance standards.

Figure 6:
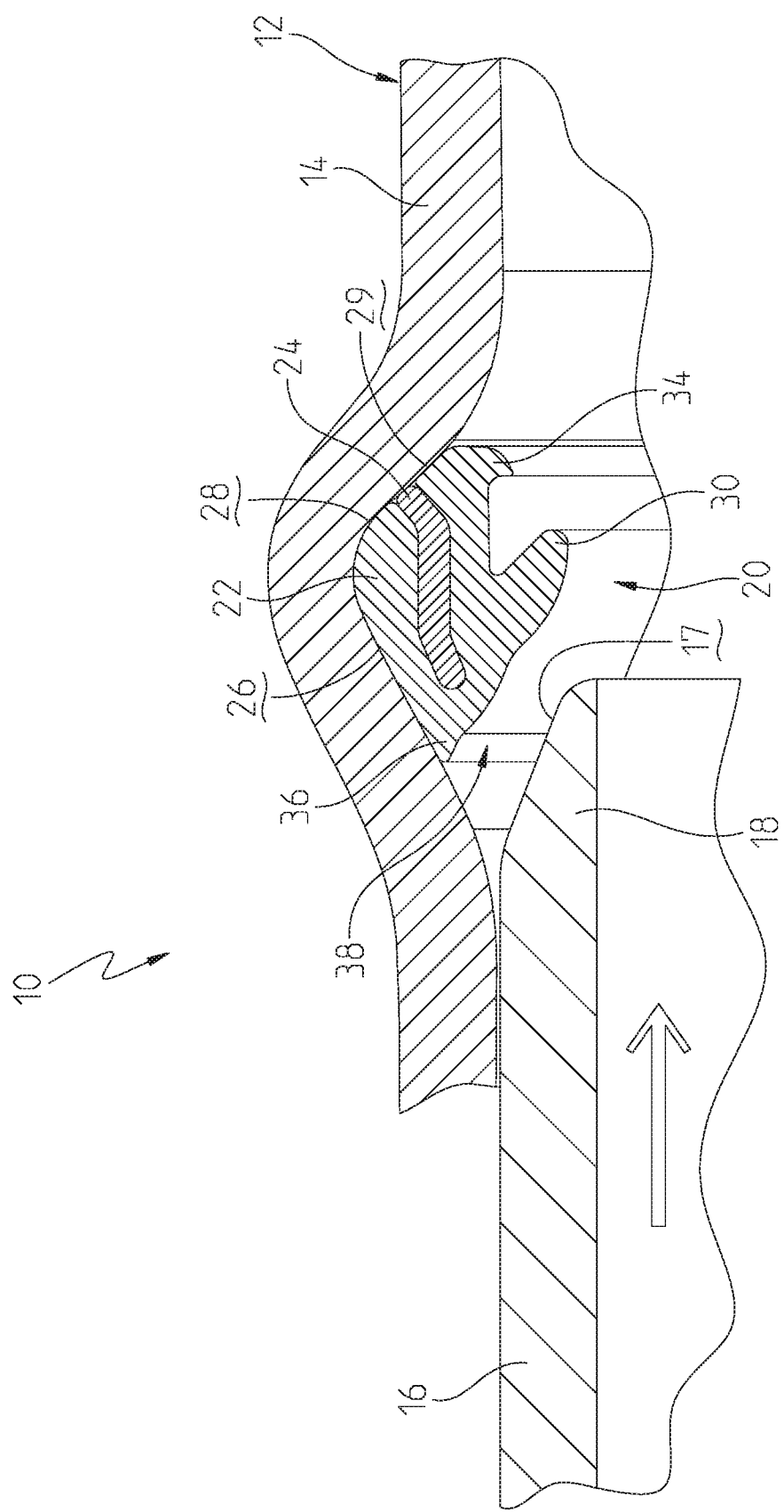
FIG. 6 is an elevation, cross-section view of the pipe assembly of FIG. 2, in which a spigot end of a pipe is approaching but not yet in contact with the seal assembly.
Figure 7:
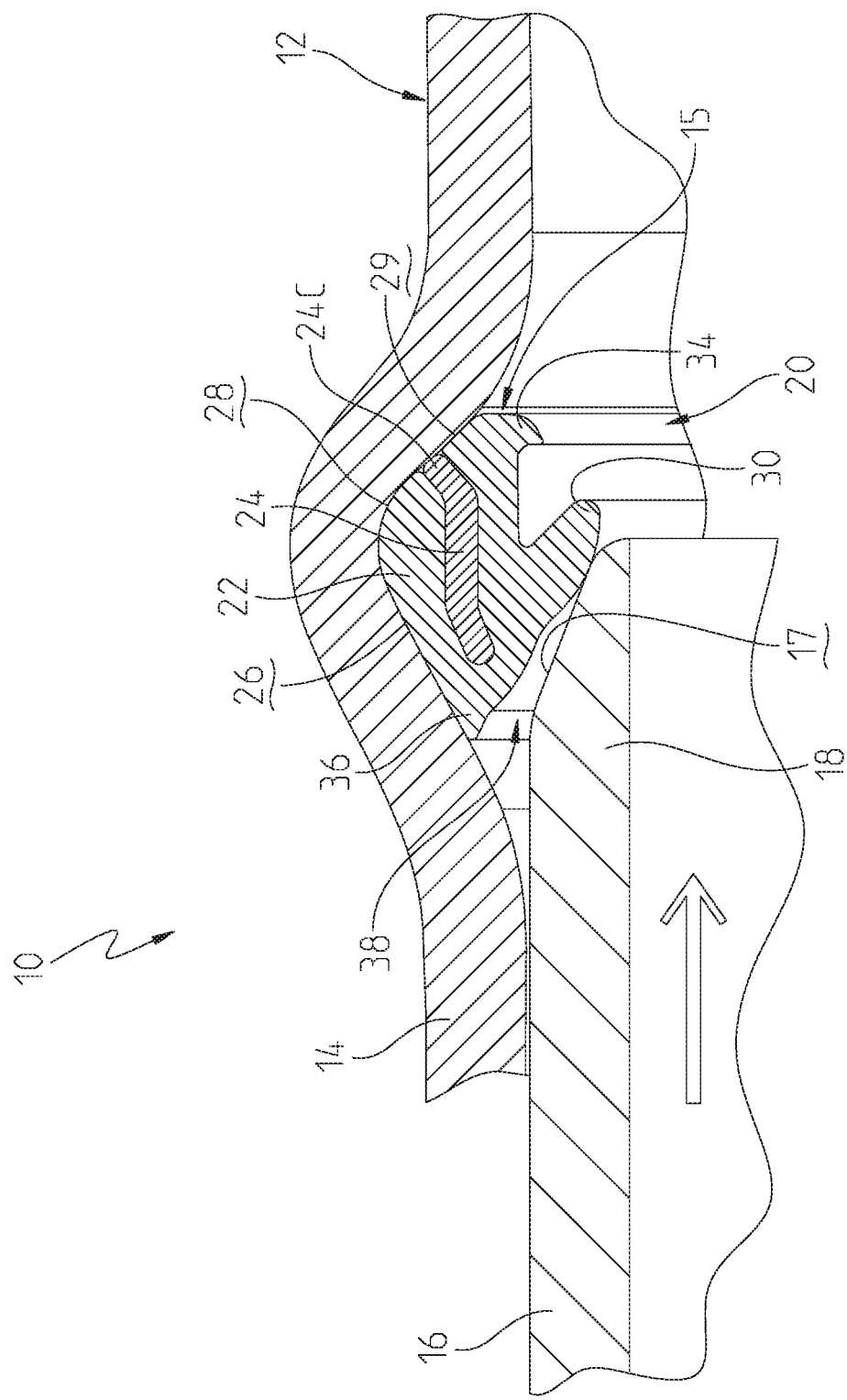
FIG. 7 is another elevation, cross-section view of the pipe assembly of FIG. 6, in which the spigot end of the pipe is initiating contact with a main sealing lobe of the seal assembly.

Stiffener 24 also provides equalized distribution of forces throughout seal body 22 during and after the assembly of second pipe 16 to first pipe 12. During the insertion process, spigot end 18 of second pipe 16 is inserted into bell end 14 of first pipe 12 as shown in FIG. 6. As spigot end 18 advances into bell end 14, a sloped surface 17 of spigot end 18 comes into initial contact with main sealing lobe 30 as shown in FIG. 7. Main sealing lobe 30 is then deflected progressively radially outwardly as it advances up sloped surface 17, until it reaches a fully deformed and deflected configuration shown in FIG. 8. In this configuration, the portion of seal body 22 radially inward of stiffener 24 defines thickness T4, while the portion of seal body 22 radially outward of stiffener 24 defines thickness T5. As illustrated, thicknesses T4 and T5 are commensurate with one another, such as within about 15-25% of one another. This facilitates even distribution of forces within seal body 22 by stiffener 24, ensuring a fluid-tight interface between main sealing lobe 30 and spigot end 18 of pipe 16, as well as at the interfaces between the radial inward surfaces of groove 15 and the radially outward surfaces 26, 28 and 29 of seal body 22. This, in turn, ensures that pressurized fluid will not leak through any potential leak path between pipes 12 and 16.

As noted above and shown in FIGS. 7 and 8, bell-side portion 24C of stiffener 24 abuts the inner surface of groove 15 between bell-side sealing surfaces 28 and 29. This direct contact between stiffener 24 and the sidewall of pipe 12 enhances the strength and resilience of seal assembly 20. In particular, as spigot end 18 of pipe 16 advances into bell end 14 of pipe 12 to deflect and deform seal body 22, the abutting contact between the semi-rigid material of stiffener 24 and the rigid material of pipe 12 allows stiffener 24 to transfer a portion of the insertion forces to the sidewall of pipe 12. This reduces the overall stress upon seal body 22, thereby reducing the potential for undesirable downward deflection of nose 36 into the insertion path (as also described in detail below).

Figure 8:
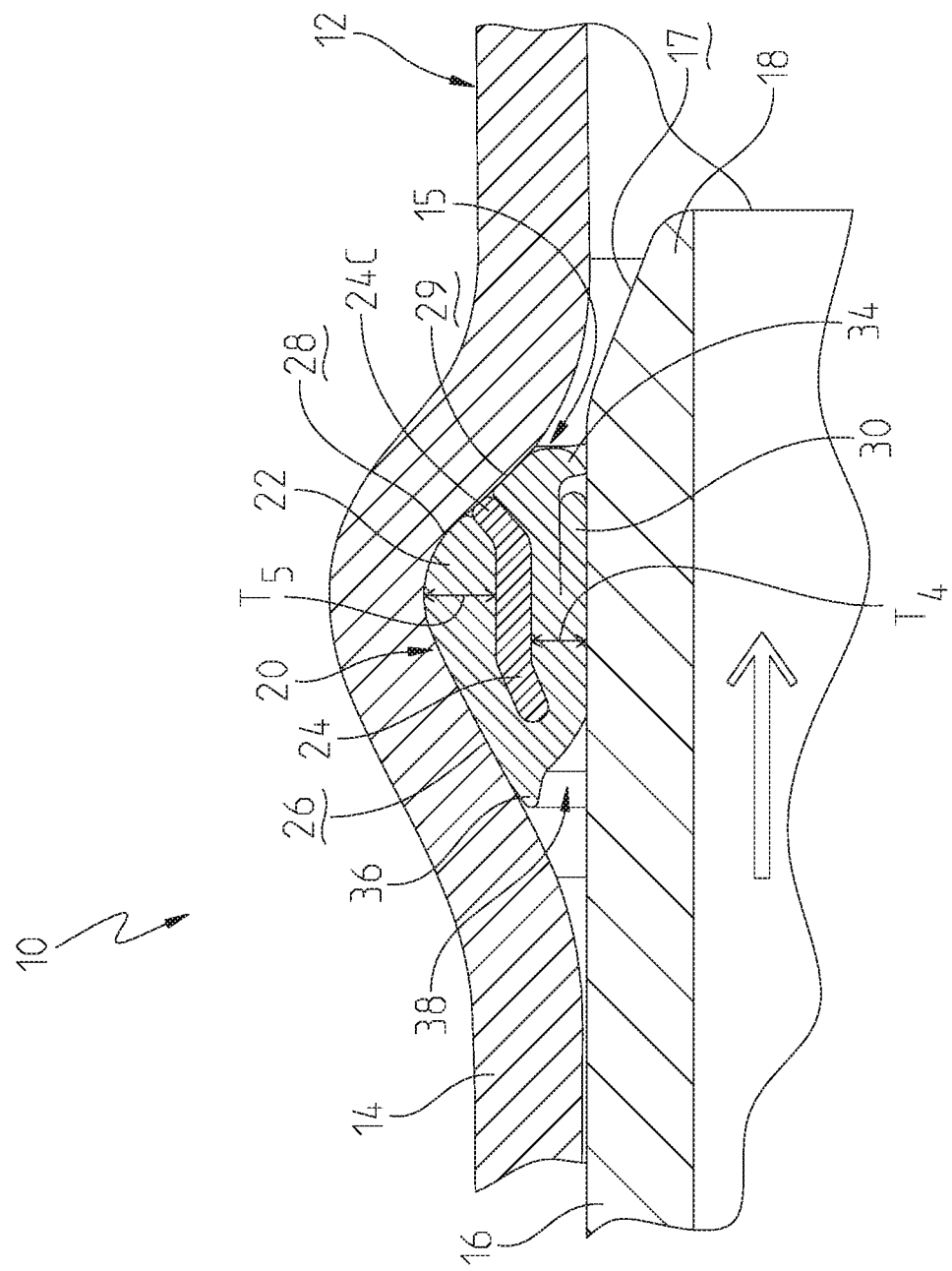
FIG. 8 is another elevation, cross-section view of the pipe assembly of FIG. 6, in which the spigot end is fully engaged with the seal assembly.

The radially inward portion of seal body 22 includes main sealing lobe 30, which extends continuously around its inner periphery and, as noted herein, provides the primary sealing surface for the interface of spigot end 18 of pipe 16 and seal assembly 20. Main sealing lobe 30 extends radially inwardly of the inner wall of bell end 14, as shown in FIG. 6. A spigot-end side of seal lobe 30 is concave, while the bell-end side of lobe 30 is generally planar. Lobe 30 is oriented to define a longitudinal lobe axis AL forming angle α (FIG. 5) with respect to the axial direction. In an exemplary embodiment, angle α is about 45 degrees, which facilitates smooth deformation and deflection of seal lobe 30 as spigot end 18 of pipe 16 advances from initial contact with lobe 30 (FIG. 7) to a fully installed configuration (FIG. 8).

The spigot-side end of seal body 22, best shown in FIG. 4, defines nose 36 forming the transition between sealing surface 26 and the adjacent radial inward surface leading toward lobe 30. Along this radial inward surface of seal body 22 immediately adjustment nose 36, concavity 38 forms an annular depression around the inner periphery of seal body 22. Referring to FIG. 3, nose 36 and concavity 38 are positioned within groove 15 and radially outside of the inner wall of bell end 14. In particular, the tip of nose 36 defines distance D1 from the inner wall of bell end 14. In one exemplary embodiment in which pipe assembly 10 defines a nominal 8-inch diameter flow path, D1 is at least 0.05 inches, thereby providing a level of protection against catching on pipe 16 during insertion as described below. In the illustrated, to-scale embodiment, D1 is about 0.189 inches. More generally, a seal assembly 20 made in accordance with the present disclosure (but having a smaller or larger nominal size, as discussed herein) may have a distance D1 that is at least 50% of each of thicknesses T1, T2 and T3 or may be up to 20% greater than any of thicknesses T1, T2 and T3, for example.

Other aspects of seal assembly 20 are similarly "tucked" within groove 15. For example, distance D2 is defined between the deepest part of concavity 38 and the inner wall of bell end 14, and distance D3 is defined between the radially-inward-most point of stiffener 24 (which is the axial end of spigot-end portion 24B) and the inner wall of bell end 14. That is, the entirety of nose 36 and stiffener 24, including their radially-inward-most portions, are disposed within groove 15 and radially outside of the insertion path of pipe 16. As illustrated in FIG. 3, distance D2 is less than distance D1, and distance D3 is less than distance D3 as shown. In the illustrated, to-scale embodiment, distance D2 is at least 0.171 inches and distance D3 is at least 0.110 inches.

In addition, the radial inward surface at the bell end-side of seal body 22, including the surfaces on either side of the trough formed by concavity 38, define angle Θ with inner surface of bell end 14 (which is substantially parallel to flow axis A, shown in FIG. 1). In an exemplary embodiment, angle Θ defines a relatively low "entry angle" of contact between spigot end 18 of pipe 16 and seal body 22 (FIG. 7). For example, angle Θ may be between 25 and 29 degrees, such as 27 degrees.

Figure 9:
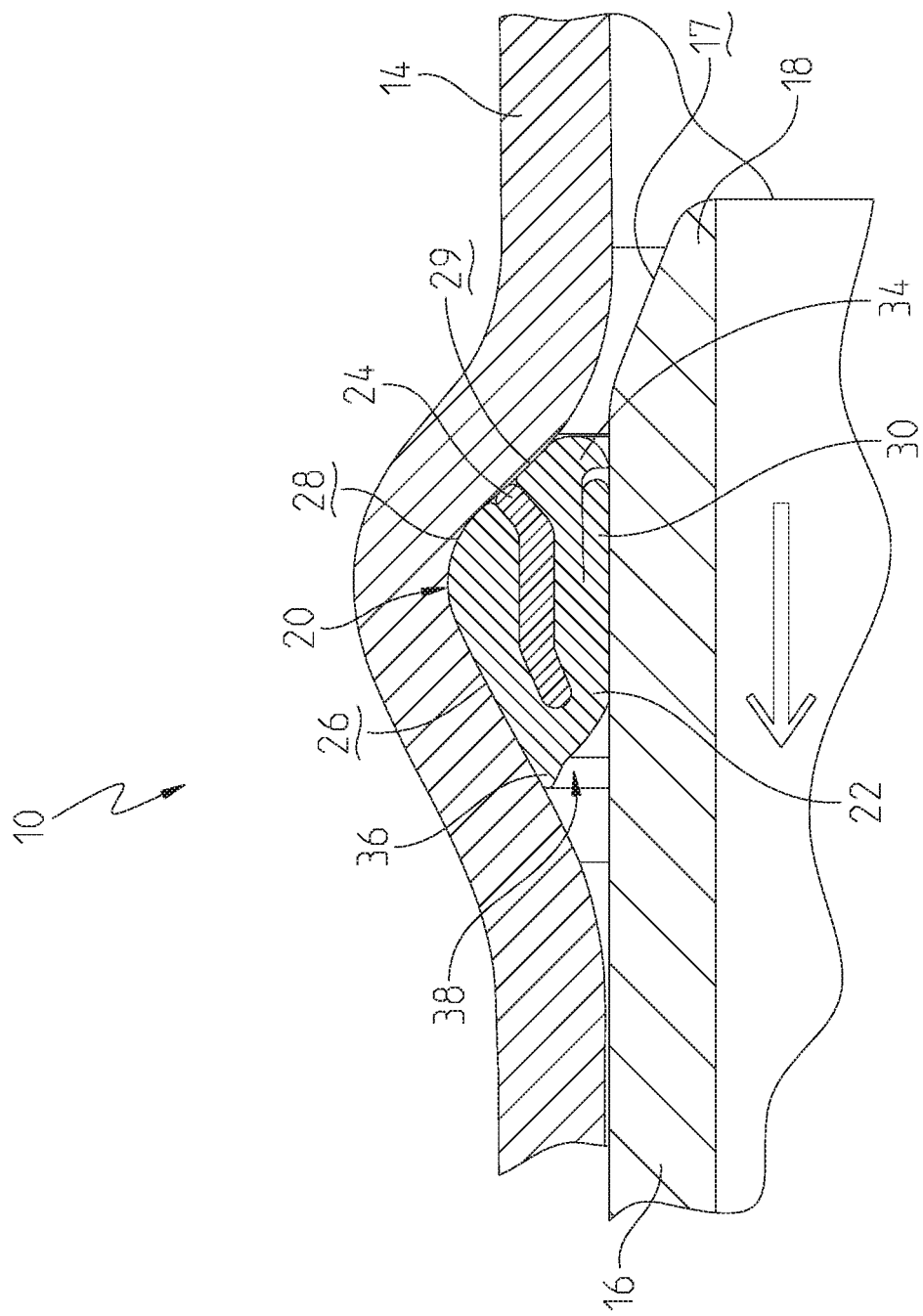
FIG. 9 is another elevation, cross-section view of the pipe assembly of FIG. 8, illustrating a resistance to removal of the spigot end by the seal assembly.

Distance D1 and angle Θ cooperate to help to prevent nose 36 from being deflected downwardly into the path of movement for spigot end 18 of pipe 16 as it advances into contact with seal assembly 20, as shown in FIGS. 7-9. To the extent that nose 36 is deflected downwardly, (that is, radially inwardly) by the forces of insertion of pipe 16, concavity 38 and the large nominal distance D1 avoids or minimizes contact between nose 36 of seal body 22 with pipe 16. This mitigates the potential for nose 36 to "catch" on the outer surface of pipe 16 and mitigates the potential for seal assembly 20 to then "roll" out of groove 15 during installation. In predicate seal designs, this type of failure upon installation is a particular risk in very cold weather installation where the material of seal body 22 is less pliable, or in situations where inadequate lubrication between the spigot end of the incoming pipe and the seal. Similarly, concavity 38 and stiffener 24 are radially outside of the insertion path of pipe 16 by distances D2 and D3 respectively as noted above. Both of these features are therefore also protected from contact with pipe 16 during the insertion process, thus mitigating the potential for any catching of seal assembly 20 upon the outer surface of pipe 16.

Seal body 22 also includes locking fin 34, shown in FIGS. 3-9. Locking fin 34 is positioned at the bell-end side of seal body 22 and extends radially inwardly into the insertion path of spigot end 18 (FIGS. 8 and 9) by amount substantially less than main sealing lobe 30 in the undeformed configuration of seal assembly 20 (FIGS. 3-6). As shown, locking fin 34 includes a bell-end surface with a radius larger than the adjacent spigot-end "point." At the other side of this point, a spigot-end surface of locking fin 34 extends generally perpendicular to flow axis A (FIG. 1).

Turning to FIG. 8, the spigot-end "point" of locking fin 34 presents a small area of surface contact with the outer surface of spigot end 18 of pipe 16 as pipe 16 is moving along the insertion path shown FIGS. 7 and 8. However, as shown in FIG. 9, when pipe 16 is urged along a removal direction from bell end 14, locking fin 34 is designed to deflect downwardly (that is, radially inwardly) such that its convex bell-end surface produces a larger surface area contact with the exterior surface of spigot end 18. This increase in surface area contact inhibits removal of pipe 16.

Locking fin 34 is axially spaced from main sealing lobe 30 such that, upon deflection and deformation of main sealing lobe 30 by contact with spigot end 18 of pipe 16 (FIG. 8), main sealing lobe 30 avoids contact with locking fin 34. In addition, locking fin provides a "backstop" for longitudinal deformation of main sealing lobe 30. That is, main sealing lobe 30 can only be longitudinally (that is, axially) deformed by a predetermined amount before abutting the spigot-end surface of locking fin 34. This predetermined amount of deformation of lobe 30 is set low enough to protect main sealing lobe 30 from damage that might otherwise occur if main sealing lobe 30 where allowed to longitudinally deflect by a greater amount. This protects mail sealing lobe 30 from adequate lubrication between pipe 16 and main sealing lobe 30, for example, and from imperfections in the exterior surface of pipe 16 that might "catch" the adjacent surface of sealing lobe 30.

In the illustrative embodiment of FIGS. 1 and 2, pipes 12 and 16 have a nominal flow path diameter of about 8 inches, a size commonly employed for transport and delivery of potable water. The proportions of seal assembly 20, which are shown to scale throughout the drawings, are appropriate to this 8 inch diameter. However, it is contemplated that the nominal dimensions of seal assembly 20, including all its features as described and shown herein, may be scaled up or down to accommodate proportionally larger or smaller pipe assemblies to which the seal assembly is applied. Other nominal pipe diameters contemplated for use in connection with a seal assembly having the features and proportions of seal assembly 20 may be as little as 2 inches, 3 inches, 4 inches, 5 inches or 6 inches, or as large as 10 inches, 12 inches, 14 inches, 16 inches, 18 inches, 20 inches, or 24 inches, for example.

In some cases, different manufactures may produce, and/or differing manufacturing methods employed by the same manufacturer may result in, slight diametric variations for a specified diameter of pipe. For instance, a single manufacturer may utilize two different manufacturing processes to produce pipe for the same diameter. But given the differences in these manufacturing processes, one or more of the diameters of the pipe (e.g., ID and/or the OD) may deviate slightly from the specified diameter during the manufacturing runs.

Figure 10:
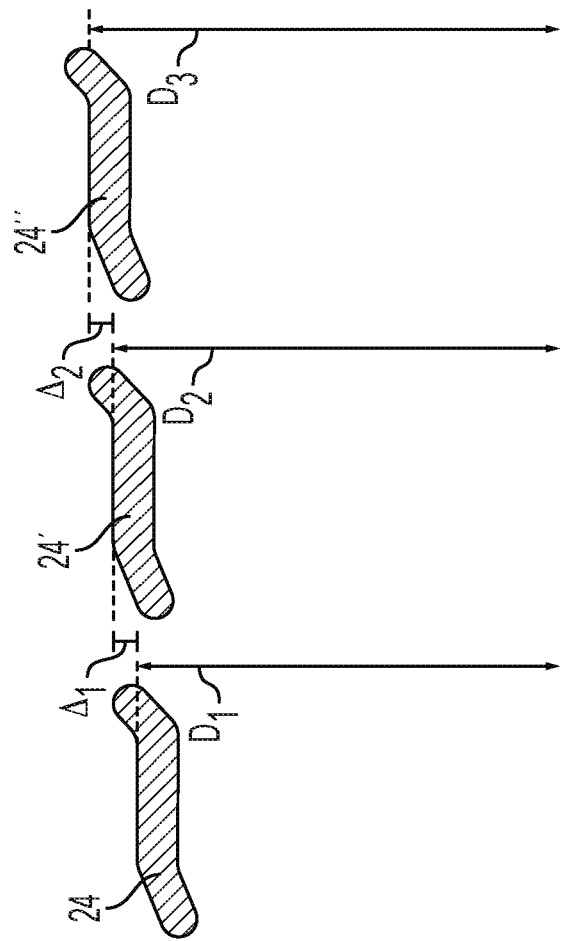
FIG. 10 is an elevation, cross-section view of the seal assembly of FIG. 8, illustrating variations in the diameter of the stiffener within the seal assembly.
Figure 10:
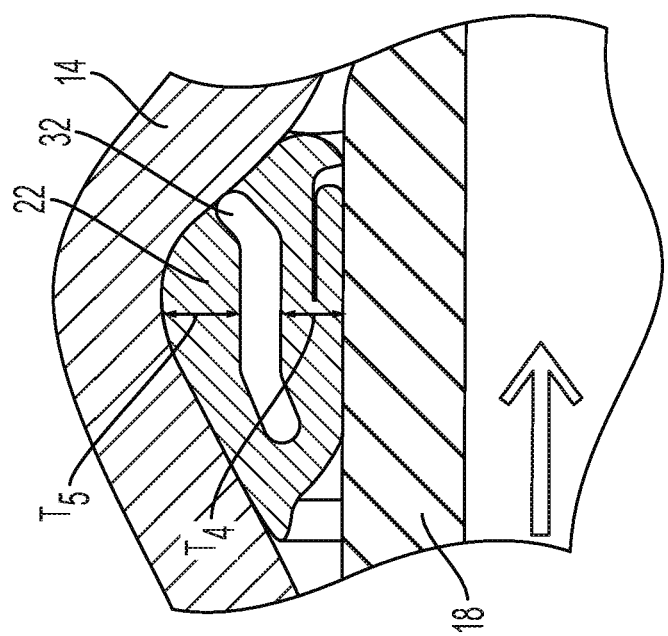

Turning to FIG. 10, different diameters of stiffener 24 (e.g., 24, 24', and 24") are illustrated which can accommodate variations in inner diameters (ID) of the bell end 14 of pipe 12 and/or the outer diameters (OD) of spigot end 18 of a second pipe 16. By using the correct size stiffener 24, a common seal assembly 20 can maintain a water-tight seal within groove 15 of bell end 14 by accounting for the variations in diameters of pipe 12 and/or second pipe 16.

The variations in the ID and/or OD of the pipes can occur in pipe 12 and/or second pipe 16. These variations can make it difficult to utilize a common seal 20 to maintain a water tight seal when the spigot end 18 of second pipe 18 is inserted into bell end 14 of pipe 12. For example, pipe 12 may be specified as an 8 inch ID pipe, but due to variations in the manufacturing process, the ID may deviate by 0.05 inches from specification (e.g., either 7.95 inches or 8.05 inches). Seal assembly 20 may be deigned to fit into groove 15 of 8 inch ID pipe 12. As such, a water tight seal between pipe 12 and second pipe 16 with too large a pipe 12 (e.g., 8.05 inches ID) or too small of a pipe 12 (e.g., 7.95 inches ID) may be difficult to achieve with seal assembly 20. These manufacturing variations can also occur in the outer diameter of spigot end 18 of second pipe 16. For example, spigot end 18 of second pipe 16 may be specified as an 8 inch OD pipe, however, due to the variations in the manufacturing processes, the OD of spigot end 18 may also vary by 0.05 inches (e.g., either 7.95 inches or 8.05 inches), making it difficult for seal 20 to maintain a water tight seal between pipe 12 and second pipe 16. In some other cases, variations in both first pipe 12 and second pipe 16 can occur simultaneously, making it even more difficult to use a common seal 20 to achieve a water tight seal between the two pipes.

In these cases, differing diameters of stiffener 24 can be used with a common seal body 22 to compensate for the variations in the ID of pipe 12 and/or the OD of second pipes 16. By using differing diameters of stiffener 24 it is possible to account for the variations in the diameters of the pipes and achieve sufficient compression between the bell end 14 and spigot end 18 to create a water tight seal. As discussed previously, seal assembly 20 is a two piece interlocking design including a seal body 22 and stiffener 24 where seal body 22 is made of a flexible material (e.g., rubber). Due to the flexibility of the materials used in seal body 22, seal assembly 20 is able to accommodate multiple diameters of stiffener 24 within stiffener pocket 32. This allows for the same (e.g., common) seal body 22 to be used with a variety of diameters of stiffeners 24 (e.g., D1, D2, D3) to accommodate differing IDs of pipe 12 and/or ODs of second pipe 16.

As discussed previously, stiffener 24 is sized to deform seal body 22 such that thicknesses T5 and T4 are achieved once spigot end 18 of second pipe 16 is inserted into bell end 14 of pipe 12. Thicknesses T5 and T4 of seal body 22, under sufficient compression, creates a water tight seal between pipe 12 and second pipe 16. When the diameter of stiffener 24 is sized correctly to the ID of pipe 12 and the OD of pipe 16 (e.g., D1), stiffener 24 provides the correct compression to deform seal body 22 to form a water tight seal between the two pipes.

However, in the case where the ID of the bell end 14 is larger than specification, too large of a gap can exist between pipe 12 and second pipe 14 such that diameter D1 of stiffener 24 does not supply sufficient compression for seal body 22 to maintain a water tight seal between the two pipes. In this case, a larger stiffener 24' with a larger diameter D2 can be used to increase the size of flexible seal 20. For example, the ceiling of stiffener 24 may increase by Δ1, such that the overall diameter D1 of stiffener 24 is increased to diameter D2 of stiffener 24'. In this case, when stiffener 24' is inserted into stiffener pocket 32, sufficient compression between bell end 14 and spigot end 18 can be achieved to create a water tight seal due to the larger diameter D2 of stiffener 24' providing more compression against bell end 14.

However, in some cases, increasing the ceiling height of stiffener 24 by Δ1 (e.g., to diameter D1 of stiffener 24') may not supply enough compression between pipe 12 and second pipe 14 (e.g., too large of a gap still exists between bell end 14 and spigot end 18, even when using stiffener 24'). In this case, a larger stiffener 24" may be used where the height of the ceiling of stiffener 24' is again increased by Δ2 to a diameter D3. In this case, stiffener 24" is inserted into stiffener pocket 32 and sufficient compression of seal body 22 between bell end 14 and spigot end 18 can now be achieved to create a water tight seal between the two pipes. Although not illustrated, if sufficient compression is still not achieved between the two pipes, larger diameters of stiffener 24 can be inserted into stiffener pocket 32 until sufficient compression is achieved between the two pipes and thus a watertight seal is formed. The process of inserting various diameters of stiffener 24 into stiffener pocket 32 to account for larger IDs of bell end 14 can also be used to compensate for smaller IDs of diameters of bell end 14. In this case, smaller diameters of stiffener 24 are inserted into stiffener pocket 32 until sufficient compression of seal body 22 is achieved to form a water tight seal between the two pipes. Additionally, inserting various diameters of stiffener 24 into stiffener pocket 32 can also be used to compensate for either smaller or larger variations in the OD of spigot end 18 to achieve sufficient compression of seal body 22 to form a water tight seal between pipe 12 and second pipe 16. Furthermore, inserting various diameters of stiffener 24 into stiffener pocket 32 can also be applied to scenarios where both the OD of spigot end 16 and the ID of bell end 14 vary simultaneously to attain sufficient compression of seal body 22 to form a water tight seal between the two pipes.

The approach of inserting various diameters of stiffener 24 into stiffener pocket 32 to account for the manufacturing diametric variations of pipe 12 and second pipe 16 can be performed at a variety of times, including either before or at the time of installation. In these cases, the timing when stiffener 24 is inserted into stiffener pocket 32 be based on minimizing the impact to the time required to install the pipes in the field.

For example, it may be known that a manufacturer of pipe 12 supplies pipe 12 with an ID of bell end 14 that is 0.05 cm greater than specification. In this case, prior to shipping the pipe to the field for installation, a stiffener 24 with a diameter sized to accommodate the larger bell end 14 can be pre-installed into stiffener pocket 32, such that when the on-site installation of pipe 12 and second pipe 16 occurs, the manufacturing variation is already accounted for (e.g., stiffener 24 is pre-installed). The same process of accounting for known manufacturing variations via pre-installation of a different diameter of stiffener 24 can also be applied to smaller sizes of bell end 14 and/or larger and smaller sizes of spigot end 14 when then diametric variations of the pipes from are generally know. However, in some cases, the variations in the IDs and ODs of the pipes may not be generally know. In this case, the field technician may perform iterative installation of various diameters of stiffener 24 to account for the variations in the diameters of pipe 12 and/or second pipe 14. This approach can also be used to correct for any incorrectly sized stiffener 24 that has been installed prior to installation of the pipe in the field.

ASPECTS

Aspect 1 is a seal assembly for a polymer pipe joint, the seal assembly including an annular flexible seal body configured to be installed about an inner periphery of the polymer pipe joint, such that the seal body defines a flow path therethrough with a flow axis, the seal body including a spigot-side sealing surface a bell-side sealing surface angled with respect to the spigot-side sealing surface, both the spigot-side sealing surface and the bell-side sealing surface facing radially outwardly from the flow axis; a main sealing lobe extending radially inwardly from the seal body; and a stiffener pocket extending into the seal body from the bell-side sealing surface; and an annular stiffener sized to be received within and occupy the stiffener pocket.

Aspect 2 is the seal assembly of Aspect 1, wherein the seal body further comprises a nose at a spigot-side end of the seal body.

Aspect 3 is the seal assembly of Aspect 2, wherein a radial inward surface extending away from the nose includes a concavity.

Aspect 4 is the seal assembly of any of Aspect 1-3, wherein the seal body further comprises a locking fin at a bell-end side of the seal body, the locking fin extending radially inwardly from the seal body by an amount less than the radial inward extend of the main sealing lobe.

Aspect 5 is the seal assembly of Aspect 4, wherein the main sealing lobe is sized to deflect and deform into contact with the rest of the seal body but without contacting the locking fin.

Aspect 6 is the seal assembly of any of Aspects 1-5, wherein the annular stiffener comprises: a central portion; a spigot-end portion extending radially inwardly away from the central portion; and a bell-end portion extending radially outward away from the central portion.

Aspect 7 is the seal assembly of Aspect 6, wherein the stiffener pocket has a shape and size commensurate with the shape and size of the annular stiffener, such that the annular stiffener occupies the entirety of the stiffener pocket.

Aspect 8 is the seal assembly of any of Aspects 1-7, wherein the bell-side sealing surface comprises a first sealing surface and a second sealing surface on opposite sides of the stiffener.

Aspect 9 is the seal assembly of any of Aspects 1-8, wherein the seal body has a substantially constant durometer throughout its cross-sectional area.

Aspect 10 is the seal assembly of any of Aspects 1-9, wherein a durometer of the seal body is between 55 and 70 as measured on the shore A scale.

Aspect 11 is the seal assembly of any of Aspects 1-10, wherein the stiffener is mechanically bonded to the seal body, without the use of adhesive or other chemical bonding.

Aspect 12 is the seal assembly of any of Aspects 1-11, in combination with a first polymer pipe having a bell end including a groove having the seal assembly received therein, the bell end having a first radial extent upstream and downstream of the groove, and the groove have a second radial extent larger than the first radial extent, the seal body received within the groove and the main sealing lobe extending radially inward of the first radial extent.

Aspect 13 is the seal assembly of Aspect 12, wherein the seal body further comprises a nose at a spigot-side terminus of the seal body, the nose radially outside of the first radial extent.

Aspect 14 is the seal assembly of Aspect 12 or Aspect 13, further including a second polymer pipe having a spigot end received within the bell end of the first polymer pipe, the spigot end deforming and deflecting the main sealing lobe toward the seal body.

Aspect 15 is the seal assembly of any of Aspects 12-14, wherein the stiffener abuts an adjacent surface of the groove.

Aspect 16 is the seal assembly of any of Aspects 12-15, wherein the bell-side sealing surface comprises a first sealing surface and a second sealing surface on opposite sides of the stiffener and engaged with the adjacent surface of the groove, such that the stiffener pocket is sealed from the flow path.

Aspect 17 is a polymer pipe joint including a seal assembly including an annular flexible seal body configured to be installed about an inner periphery of the polymer pipe joint, such that the seal body defines a flow path therethrough with a flow axis, the seal body including a spigot-side sealing surface; a bell-side sealing surface angled with respect to the spigot-side sealing surface, both the spigot-side sealing surface and the bell-side sealing surface facing radially outwardly from the flow axis; and a main sealing lobe extending radially inwardly from the seal body; and a nose at a spigot-side terminus of the seal body; and a first polymer pipe having a bell end including a groove having the seal assembly received therein, the bell end having a first radial extent upstream and downstream of the groove, and the groove have a second radial extent larger than the first radial extent, the seal body received within the groove and the main sealing lobe extending radially inward of the first radial extent, wherein the nose of the seal body is radially outside of the first radial extent.

Aspect 18 is the polymer pipe joint of Aspect 17, wherein the nose defines a distance from the first radial extent of the first polymer pipe that is at least 50% of a minimum thickness of the seal body.

Aspect 19 is a method of configuring a seal assembly for use in sealing a bell of a first pipe and a spigot end of a second pipe including: providing a sealing body assembly including a spigot-side sealing surface, a bell-side sealing surface, a main sealing lobe, and a stiffener pocket; providing two or more annular stiffeners wherein each stiffener has a different size of an annular diameter; selecting one of the one or more annular stiffeners based on an annular diameter of the bell and an annular diameter of the spigot; inserting the selected annular stiffener into the stiffener pocket of the sealing body; and determining if a seal between the bell-side sealing surface, the spigot-side sealing surface, and the lobe is water tight after inserting the selected annular stiffener into the stiffening pocket.

Aspect 20 is the method of Aspect 19, further including: determining that the seal between the bell-side sealing surface, the spigot-side sealing surface, and the lobe is not water tight after inserting the selected annular stiffener; removing the first annular stiffener from the stiffener pocket; selecting a second annular stiffener from the one or more annular stiffeners based on the annular diameter of the bell and the annular diameter of the spigot; inserting the selected second annular stiffener into the stiffener pocket of the sealing body; determining that the seal between the bell-side sealing surface, the spigot-side sealing surface, and the lobe is water tight after inserting the selected second annular stiffener into the stiffening pocket.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seal assembly for a polymer pipe joint, the seal assembly comprising:
   an annular flexible seal body configured to be installed about an inner periphery of the polymer pipe joint, such that the seal body defines a flow path therethrough with a flow axis, the seal body comprising:

a spigot-side sealing surface;
a bell-side sealing surface angled with respect to the spigot-side sealing surface, both the spigot-side sealing surface and the bell-side sealing surface facing radially outwardly from the flow axis;
a main sealing lobe extending radially inwardly from the seal body; and
a stiffener pocket extending into the seal body from the bell-side sealing surface; and
an annular stiffener sized to be received within and occupy the stiffener pocket, wherein the annular stiffener comprises:
a central portion;
a spigot-end portion extending radially inwardly away from the central portion; and
a bell-end portion extending radially outward away from the central portion.

2. The seal assembly of claim 1, wherein the stiffener pocket has a shape and size commensurate with the shape and size of the annular stiffener, such that the annular stiffener occupies the entirety of the stiffener pocket.

3. The seal assembly of claim 1, wherein the bell-side sealing surface comprises a first sealing surface and a second sealing surface on opposite sides of the stiffener.

4. The seal assembly of claim 1, wherein the seal body has a substantially constant durometer throughout its cross-sectional area.

5. The seal assembly of claim 1, wherein a durometer of the seal body is between 55 and 70 as measured on the shore A scale.

6. The seal assembly of claim 1, wherein the stiffener is mechanically bonded to the seal body, without the use of adhesive or other chemical bonding.

7. The seal assembly of claim 1, in combination with a first polymer pipe having a bell end including a groove having the seal assembly received therein, the bell end having a first radial extent upstream and downstream of the groove, and the groove have a second radial extent larger than the first radial extent, the seal body received within the groove and the main sealing lobe extending radially inward of the first radial extent.

8. The seal assembly of claim 7, wherein the seal body further comprises a nose at a spigot-side terminus of the seal body, the nose radially outside of the first radial extent.

9. The seal assembly of claim 8, further comprising a second polymer pipe having a spigot end received within the bell end of the first polymer pipe, the spigot end deforming and deflecting the main sealing lobe toward the seal body.

10. The seal assembly of claim 7, wherein the stiffener abuts an adjacent surface of the groove.

11. The seal assembly of claim 10, wherein the bell-side sealing surface comprises a first sealing surface and a second sealing surface on opposite sides of the stiffener and engaged with the adjacent surface of the groove, such that the stiffener pocket is sealed from the flow path.

12. The seal assembly of claim 1, wherein the seal body further comprises a nose at a spigot-side end of the seal body.

13. The seal assembly of claim 12, wherein a radial inward surface extending away from the nose includes a concavity.

14. The seal assembly of claim 1, wherein the seal body further comprises a locking fin at a bell-end side of the seal body, the locking fin extending radially inwardly from the seal body by an amount less than the radial inward extend of the main sealing lobe.

15. The seal assembly of claim 14, wherein the main sealing lobe is sized to deflect and deform into contact with the rest of the seal body but without contacting the locking fin.

16. A polymer pipe joint comprising:
a seal assembly comprising:
an annular flexible seal body configured to be installed about an inner periphery of the polymer pipe joint, such that the seal body defines a flow path therethrough with a flow axis, the seal body comprising:
a spigot-side sealing surface;
a bell-side sealing surface angled with respect to the spigot-side sealing surface, both the spigot-side sealing surface and the bell-side sealing surface facing radially outwardly from the flow axis; and
a main sealing lobe extending radially inwardly from the seal body; and
a nose at a spigot-side terminus of the seal body;
a stiffener pocket extending into the seal body from the bell-side sealing surface:
an annular stiffener sized to be received within and occupy the stiffener pocket, the stiffener including a central portion extending substantially along an axial direction, a spigot-side portion, a first thickness T1 defined between an axial end of the stiffener and a nearest exterior surface of the seal body near the nose, a second thickness T2 defined between a radially outward surface of the spigot-side portion of the stiffener and the spigot-side sealing surface, and a third thickness T3 defined between a radially inward surface of the central portion of the stiffener and the nearest exterior surface of the seal body adjacent the main sealing lobe, with thicknesses T1, T2 and T3 being within 15-20% of one another; and
a first polymer pipe having a bell end including a groove having the seal assembly received therein, the bell end having a first radial extent upstream and downstream of the groove, and the groove have a second radial extent larger than the first radial extent, the seal body received within the groove and the main sealing lobe extending radially inward of the first radial extent,
wherein the nose of the seal body is radially outside of the first radial extent.

17. The polymer pipe joint of claim 16, wherein the nose defines a distance from the first radial extent of the first polymer pipe that is at least 50% of a minimum thickness of the seal body.

18. The polymer pipe joint of claim 16, wherein the seal body has a substantially constant durometer throughout its cross-sectional area.

19. The polymer pipe joint of claim 16, wherein the bell-side sealing surface comprises a first sealing surface and a second sealing surface on opposite sides of the stiffener and engaged with an adjacent surface of the groove, such that the stiffener pocket is sealed from a fluid flow path of the pipe joint.

20. A method of configuring a seal assembly for use in sealing a bell of a first pipe and a spigot end of a second pipe comprising:
providing a sealing body assembly including a spigot-side sealing surface, a pair of bell-side sealing surfaces angled with respect to one another with a rounded transition therebetween, a main sealing lobe, and a stiffener pocket;
providing two or more annular stiffeners wherein each stiffener has a different size of an annular diameter;

selecting one of the one or more annular stiffeners based on an annular diameter of the bell and an annular diameter of the spigot;

inserting the selected annular stiffener into the stiffener pocket of the sealing body;

inserting the sealing body assembly into a groove in a bell end of a pipe, the groove having a pair of radially inwardly-facing, sloped surfaces with a rounded transition therebetween which respectively conform to the bell-side sealing surfaces of the sealing body assembly; and determining if a seal between the bell-side sealing surface, the spigot-side sealing surface, and the lobe is water tight after inserting the selected annular stiffener into the stiffening pocket.

21. The method of claim 20, further comprising:

determining that the seal between the bell-side sealing surface, the spigot-side sealing surface, and the lobe is not water tight after inserting the selected annular stiffener;

removing the first annular stiffener from the stiffener pocket;

selecting a second annular stiffener from the one or more annular stiffeners based on the annular diameter of the bell and the annular diameter of the spigot;

inserting the selected second annular stiffener into the stiffener pocket of the sealing body;

determining that the seal between the bell-side sealing surface, the spigot-side sealing surface, and the lobe is water tight after inserting the selected second annular stiffener into the stiffening pocket.

* * * * *